United States Patent [19]

Renfro

[11] Patent Number: 4,696,206

[45] Date of Patent: Sep. 29, 1987

[54] TORQUE WRENCH

[75] Inventor: James G. Renfro, Spring, Tex.

[73] Assignee: Hughes Tool Company, Houston, Tex.

[21] Appl. No.: 850,313

[22] Filed: Apr. 10, 1986

[51] Int. Cl.[4] .................. B25B 13/50

[52] U.S. Cl. .................. 81/57.34; 173/164; 81/470

[58] Field of Search .................. 81/57.15, 57.16, 57.19, 81/57.33, 57.34, 52, 54, 470; 173/164, 20

[56] References Cited

U.S. PATENT DOCUMENTS

| | | | |
|---|---|---|---|
| Re. 28,899 | 7/1976 | Himmelstein et al. | 173/12 |
| 2,544,639 | 3/1951 | Calhoun | 255/35 |
| 2,720,803 | 10/1955 | Rice et al. | 81/52.4 |
| 3,021,739 | 2/1962 | Grundmann | 81/53 |
| 3,696,872 | 10/1972 | Jonsson | 173/149 |
| 3,796,131 | 3/1974 | Workman, Jr. et al. | 91/1 |
| 3,965,778 | 6/1976 | Aspers et al. | 81/52.4 R |
| 4,348,920 | 9/1982 | Boyadjieff | 81/57.16 X |
| 4,445,402 | 5/1984 | Farr et al. | 81/57.16 |
| 4,483,236 | 11/1984 | Curtiss | 91/1 |

*Primary Examiner*—Frederick R. Schmidt
*Assistant Examiner*—Debra S. Meislin
*Attorney, Agent, or Firm*—H. Dennis Kelly

[57] ABSTRACT

A torque wrench for making and breaking connections between sections of drill pipe. The torque wrench has upper and lower wrench assemblies, each having a gate, a latch, and a clamp. Clamping cylinders apply clamping pressure to the clamps. Torque cylinders apply torque pressure to the upper wrench assembly, to cause rotation of the upper wrench assembly relative to the lower wrench assembly. When the torque pressure is adjusted, a valve causes the clamping pressure applied to the clamping cylinders to automatically vary linearly with the torque pressure.

5 Claims, 7 Drawing Figures

TORQUE WRENCH

BACKGROUND OF THE INVENTION

1. Field of the Invention

This invention relates in general to the field of material handling equipment. In particular, the invention relates to torque wrenches for making and breaking connections between sections of drill pipe.

2. Description of the Prior Art

U.S. Pat. No. 4,348,920 (Boyadjieff), issued Sept. 14, 1982, shows a power driven tool for making and breaking threaded connections between drill pipe sections. The tool includes a movable carriage, a well pipe spinner, and two torque wrench assemblies. The torque wrench assemblies are used to make and break connections between the tool joints on upper and lower pipe sections. The spinner is used to rotate the upper pipe section rapidly into or out of connection with the lower pipe section.

Each torque wrench assembly has a gate, a latch, and a clamp, for clamping onto the tool joint on the end of the section of drill pipe. Each torque wrench assembly is rotatable relative to the other wrench assembly, and has torque cylinders to apply torque in either direction to the tool joint. The clamps and the torque cylinders are hydraulically powered.

Larger diameter drill pipe generally requires a higher torque pressure to make and break connections. Sufficient clamping pressure must be maintained, or the pipe will slip as increased torque is applied to the connection. However, excessive clamping pressure can damage the pipe.

It has been known, therefore, to provide for variable torque pressure and clamping pressure. These pressures are varied by manually adjusting a pair of hydraulic valves in the hydraulic system of the tool. If either pressure was increased too quickly, either the pipe was damaged by excessive clamping pressure, or the pipe slipped because of insufficient clamping pressure.

SUMMARY OF THE INVENTION

The tool of the invention includes a wrench assembly for gripping a section of pipe. The wrench assembly has a hydraulic clamp, which clamps onto a tool joint on the end of the pipe. A hydraulic torque cylinder applies torque to the wrench assembly, in order to rotate the wrench assembly.

The amount of hydraulic pressure applied to the torque cylinder is adjustable. As the torque pressure is increased, a hydraulic valve causes the hydraulic pressure applied to the clamp to be automatically vary with the torque pressure.

The above, as well as additional objects, features, and advantages of the invention, will become apparent in the following detailed description.

DESCRIPTION OF THE PREFERRED EMBODIMENT

Figure 1:
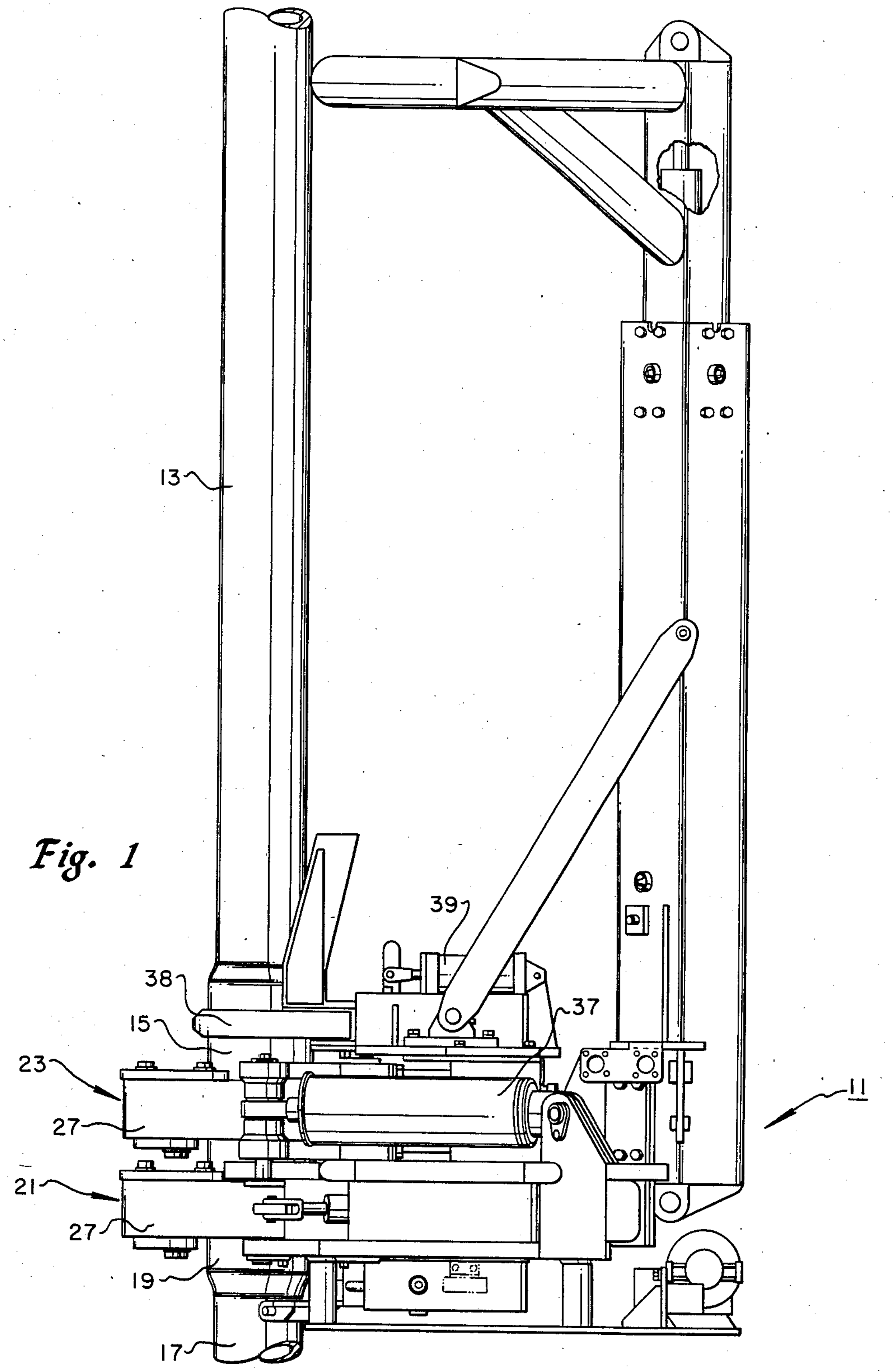
FIG. 1 is side view of a hydraulic torque wrench.
Figure 2:
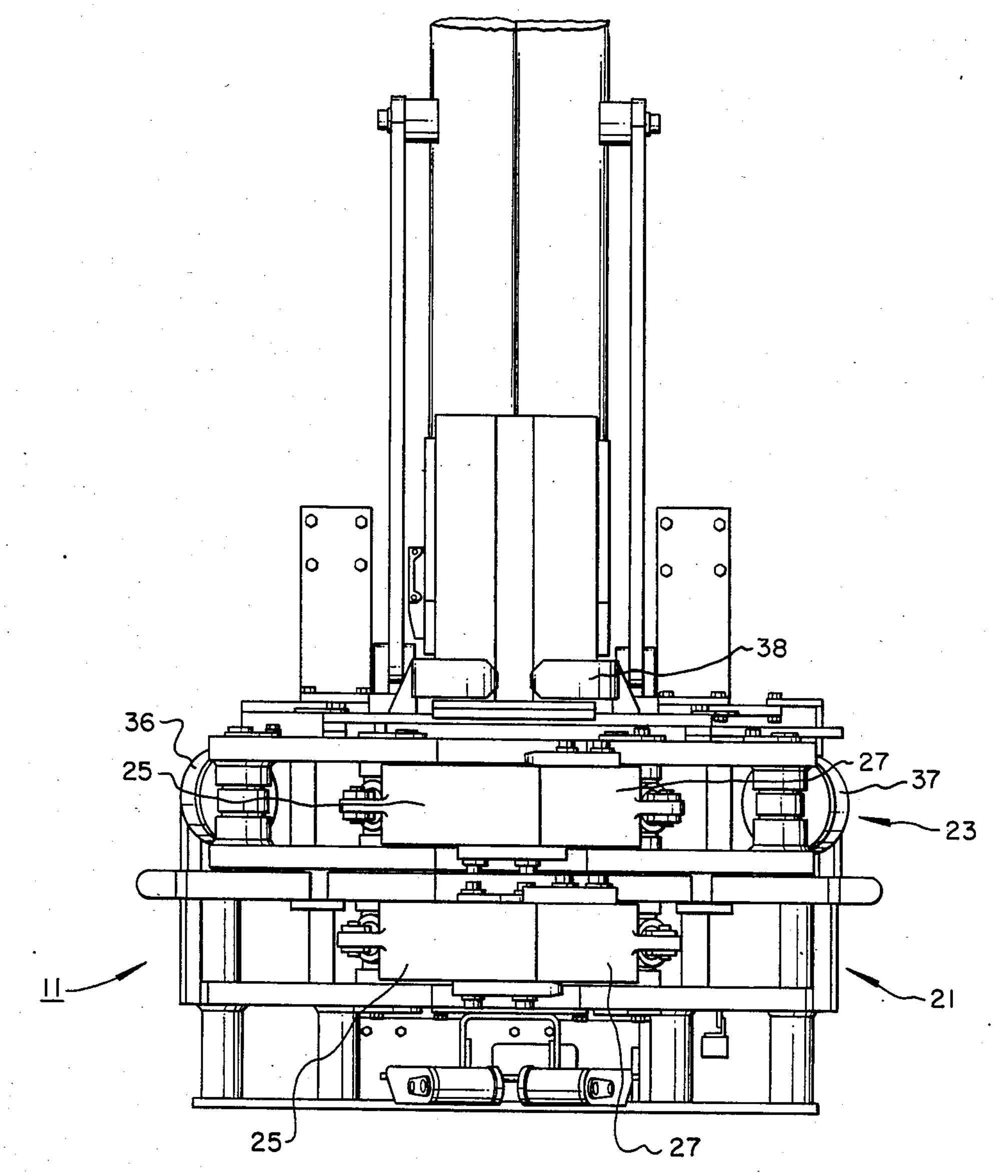
FIG. 2 is a front view of a hydraulic torque wrench.
Figure 3:
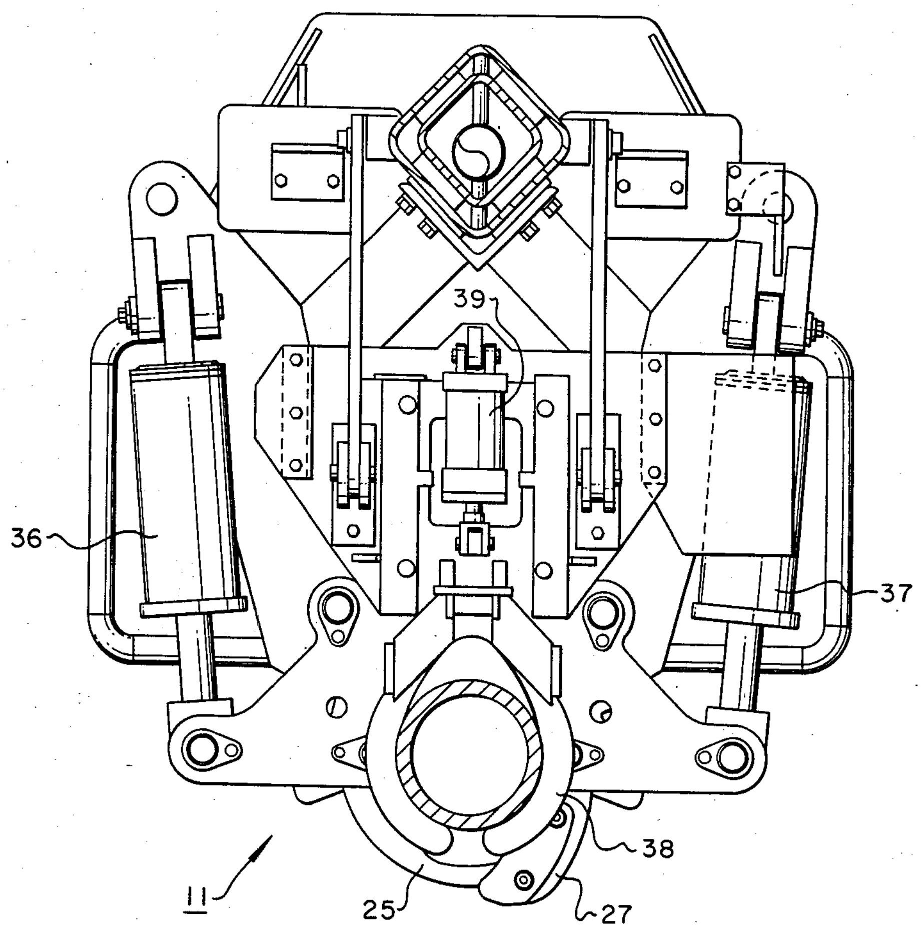
FIG. 3 is a top view of a hydraulic torque wrench.

FIGS. 1–3 show a torque wrench 11 for making and breaking connections between sections of drill pipe. The upper section 13 of drill pipe has a tool joint 15 on the lower end, and the lower section 17 of drill pipe has a tool joint 19 on the upper end. The two tool joints 15, 19 form a threaded connection between the two sections 13, 17 of drill pipe.

Figure 4:
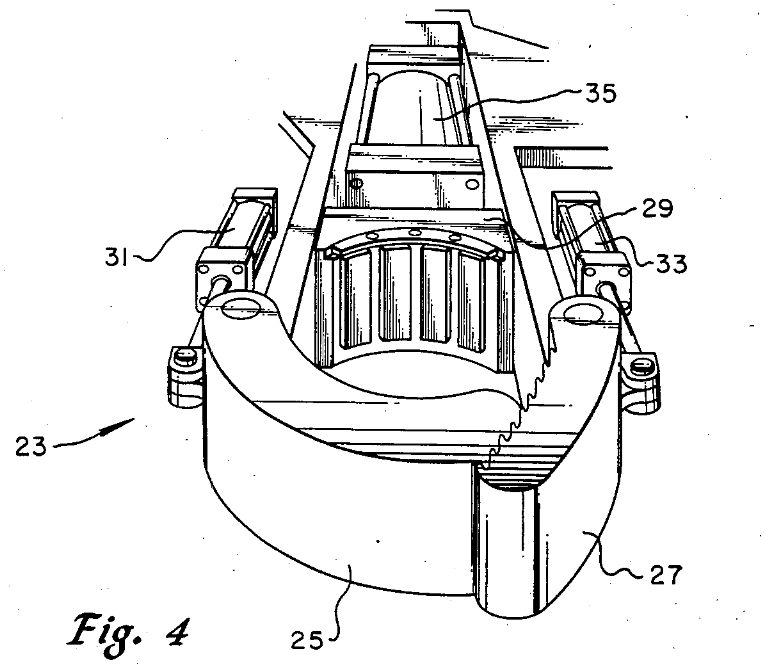
FIG. 4 is a perspective view of a wrench assembly.

The torque wrench 11 has a lower wrench assembly 21, and an upper wrench assembly 23, mounted directly above the lower wrench assembly 21. As shown in FIG. 4, each wrench assembly 21, 23 has a gate 25, a latch 27, and a clamp 29. The gate 25 is opened and closed by a hydraulic cylinder 31, and the latch 27 is opened and closed by a second hydraulic cylinder 33. When the latch 27 is closed on the gate 25, the latch 25 locks the gate 27 in the closed position. A third hydraulic cylinder 35 moves the clamp 29 toward and away from the tool joint 15, 19.

A pair of torque cylinders 36, 37 are mounted on the torque wrench 11 and attached to the upper wrench assembly 23. In a method to be described, these cylinders 36, 37 apply a torque to the upper wrench assembly 23 to cause a rotation of the upper wrench assembly 23 relative to the lower wrench assembly 21. The relative rotation of the wrench assemblies 21, 23 is used to make up and break out connections between the tool joints 15, 19 on the sections 13, 17 of drill pipe.

A grabber 38 is mounted above the upper wrench assembly 23, as shown in FIGS. 1–3. The grabber 38 is opened and closed by a hydraulic cylinder 39. The grabber 38 aligns the upper section 13 of drill pipe with the wrench assemblies 21, 23.

FIGS. **5*a* and 5*b* illustrate the hydraulic circuitry of the torque wrench 11. Hydraulic power is supplied to the wrench 11 by a pressure supply line 41. The system pressure in the pressure supply line 41 is preferably 2000 pounds per square inch. Hydraulic fluid is returned to a tank 43 or to a case drain 45. A gauge 47** indicates the system pressure.

The system pressure is applied through a directional control valve 49 to a hydraulic pull back motor 51. The pull back motor 51 moves the torque wrench 11 toward or away from the drill pipe 13, 17. The direction of movement is determined by the directional control valve 49. A pair of check valves 53, 55 hold the motor 51 in place whenever the directional control valve 49 is in the off position.

The system pressure is supplied through another directional control valve 57 to a hydraulic cylinder 59. This cylinder 59 is used to position the grabber 38.

A directional control valve 61 directs pressure to open or close a second directional control valve 63. This second directional control valve 63 directs the system pressure to the hydraulic cylinder 39, which opens or closes the grabber 38.

A shuttle valve 65 allows system pressure to be applied to the directional control valve 63, if the pull back motor 51 is pressurized to pull the torque wrench 11 away from the drill pipe. This is a safety measure, which prevents the torque wrench 11 from being pulled away from the drill pipe while the grabber 38 is closed on the drill pipe. If pressure is applied through check valve 55 to the pull back motor 51, to pull the torque wrench 11 back, pressure is also applied through the shuttle valve 65 to the directional control valve 63. This shifts the directional control valve 63 to direct pressure to the cylinder 39 to open the grabber 38.

Directional control valve 67 directs the system pressure to a hydraulic cylinder 69, which raises the torque wrench 11. Pressure is applied through a variable restriction 71 and a check valve 73 to one end of the cylinder 69. When the directional control valve 67 is in the off position, the check valve 73 holds the torque wrench 11 at a set height. To lower the torque wrench 11, the directional control valve 67 applies the system pressure to a pilot line, to open the check valve 73. The pressure in the cylinder 69 escapes, and the weight of the torque wrench 11 causes the torque wrench 11 to lower.

The hydraulic circuitries of the two wrench assemblies 21, 23 are independent, but identical. The two circuitries will thus be described together. To close the wrench assembly 21, 23 onto a tool joint 15, 19, a directional control valve 75 is opened. The directional control valve 75 directs the system pressure to flow control valve 77. The flow control valve 77 reduces the pressure by a set amount, and applies the reduced pressure to one end of the cylinder 31, which closes the gate 25.

When the gate 25 is closed, a sequence valve 79 opens and applies the reduced pressure to one end of the cylinder 33, which closes the latch 27. When the latch 27 is closed, a sequence valve 81 opens, and applies the reduced pressure to a directional control valve 83.

The directional control valve 83 shifts, and applies the system pressure through a check valve 85 to one end of the clamping cylinder 35. This causes the clamp 29 to be closed onto the tool joint 15, 19 with a pressure of 2000 pounds per square inch. A gauge (not shown) indicates the clamping pressure.

To open the wrench assemblies 21, 23, the directional control valve 75 is opened to the opposite position. The directional control valve 75 directs the system pressure to flow control valve 89. The flow control valve 89 reduces the pressure by a set amount, and applies the reduced pressure to one end of the cylinder 33, which opens the latch 27.

When the latch 27 is open, a sequence valve 91 opens and applies the reduced pressure to one end of the cylinder 31, which opens the gate 25. The reduced pressure is also applied to the directional control valve 83.

The directional control valve 83 shifts, and applies the reduced pressure to one end of the clamping cylinder 35. The reduced pressure also flows through a pilot line to open the check valve 85. The clamp 29 is thus moved back away from the tool joint 15, 19.

Torque is applied to the upper wrench assembly 23 by the torque cylinders 36, 37. This is done by opening a directional control valve 93. The directional control valve 93 directs the system pressure to a pressure reducing valve 95.

The pressure reducing valve 95 reduces the system pressure by a set amount, and directs the reduced pressure through a ball valve 97 to one end of one torque cylinder 36 and to the other end of the other torque cylinder 37. The reduced pressure also flows through a shuttle valve 99 and is indicated on a gauge 101.

Figure 6:
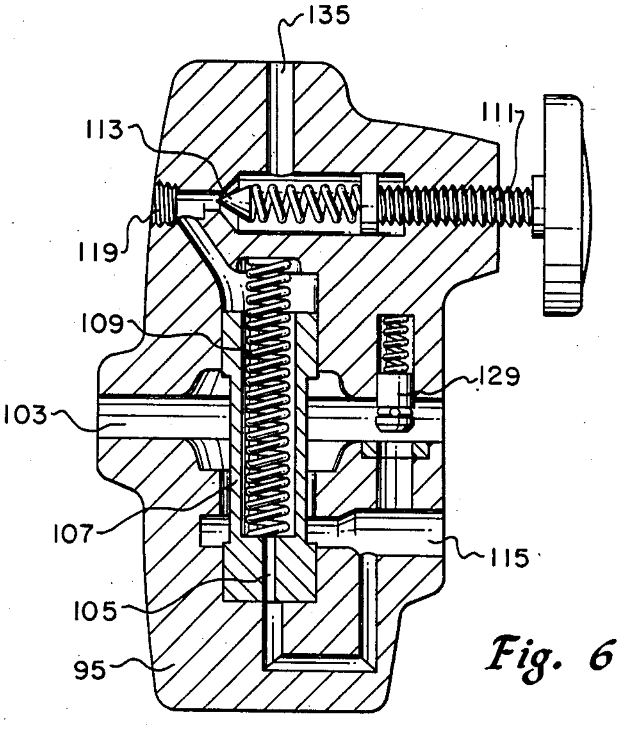
FIG. 6 is a sectional view of a pressure reducing valve, of the type used in the preferred embodiment of the invention.
Figure 5A:
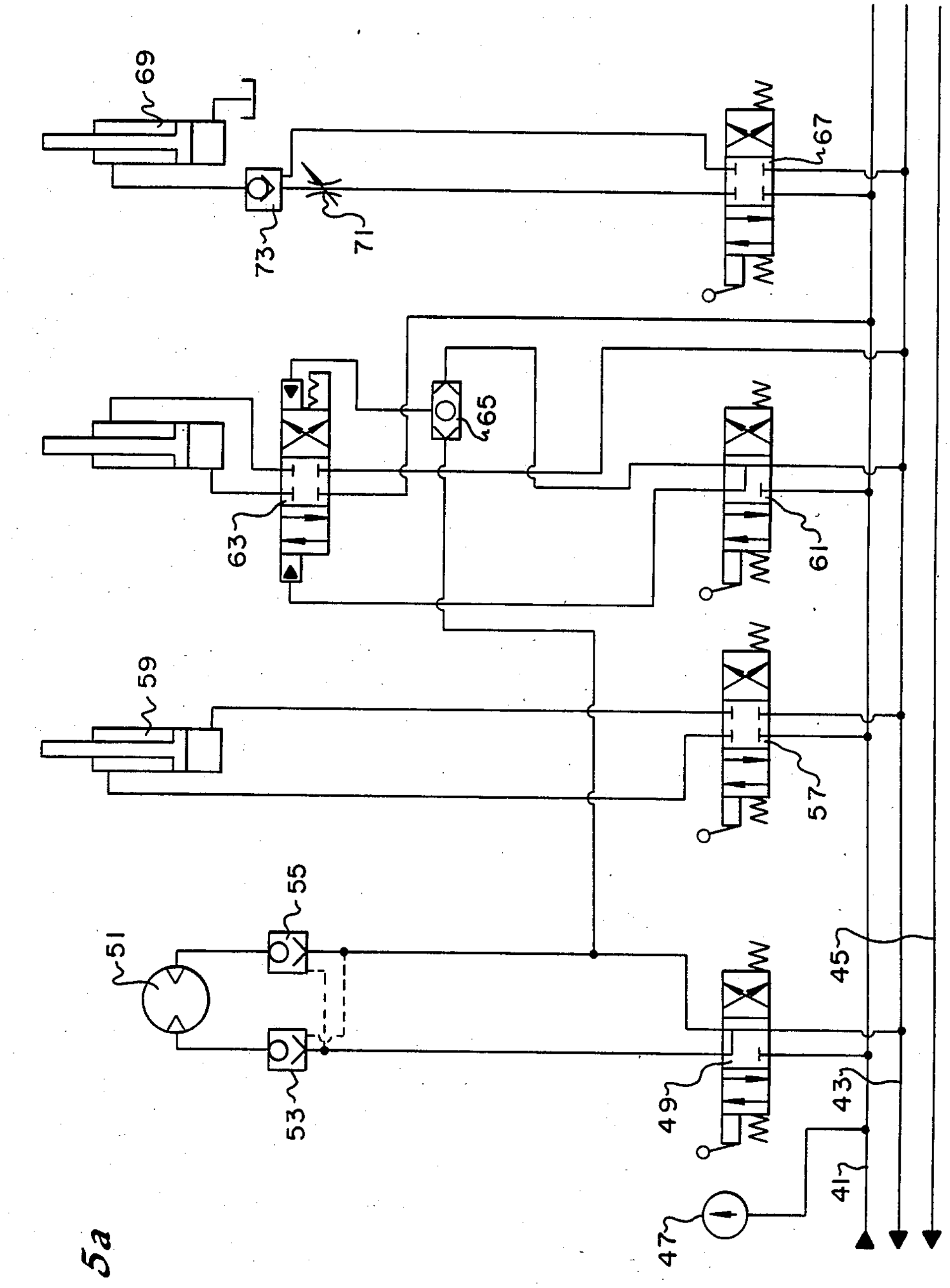
FIGS. 5*a* and 5*b* are a schematic drawing of the hydraulic system of the torque wrench.
Figure 5B:
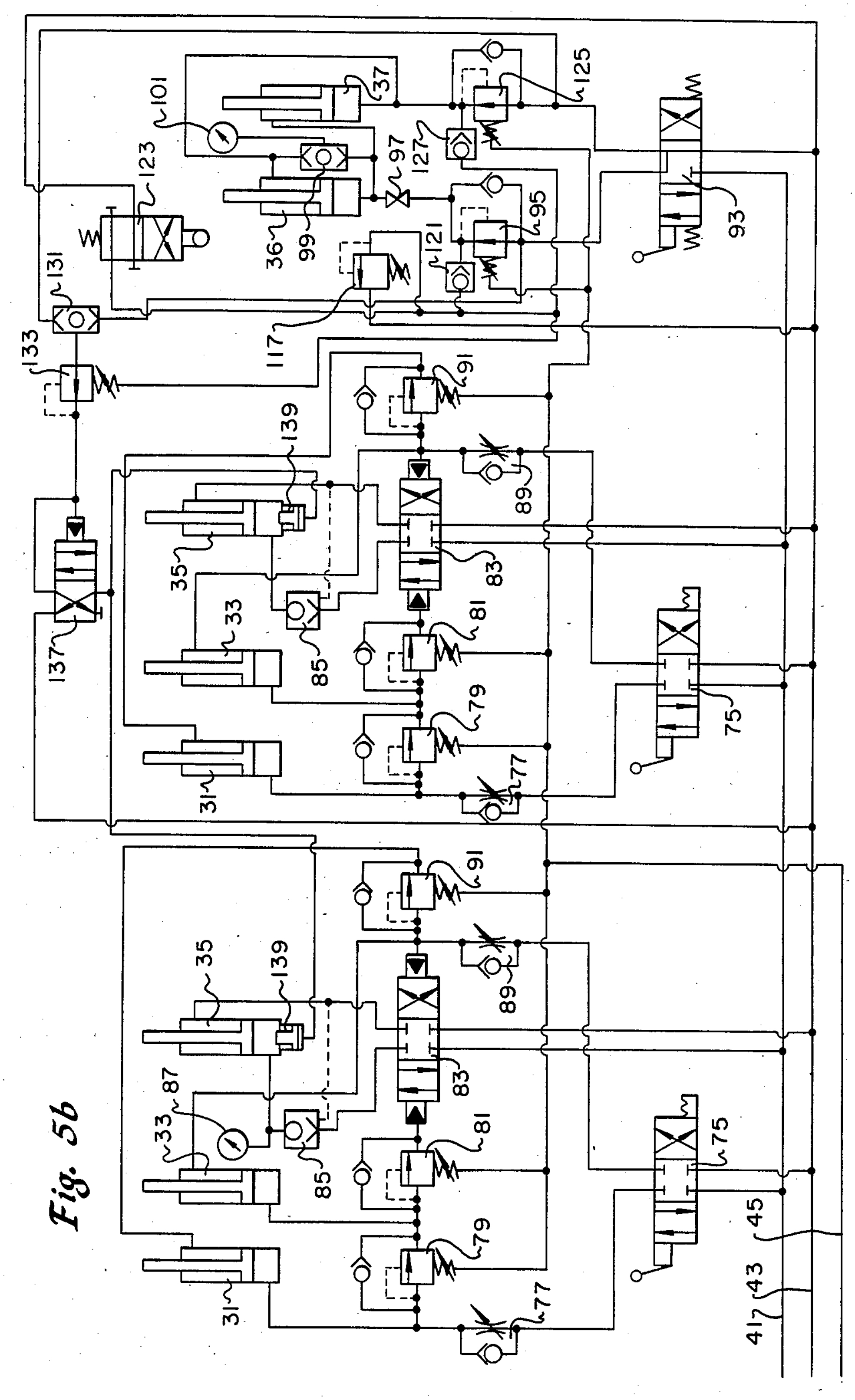

This pressure reducing valve 95 is shown schematically in FIG. 5*b* and in section in FIG. 6. The system pressure of 2000 pounds per square inch enters an inlet 103 and fills the interior of the valve 95. The pressure flows through an orifice 105 in a spool 107 to equalize the pressure on both sides of the spool 107. When the pressure is equalized, a light spring 109 biases the spool 107 in the open position, shown in FIG. 6.

The pressure reducing valve 95 can be adjusted by an adjusting screw 111. If the pressure inside the valve 95 exceeds the setting of the adjusting screw 111, a pilot valve 113 opens and allows the excess pressure to bleed off into the case drain 45. The reduced pressure then exits the valve 95 through an outlet 115 and continues to the torque cylinders 36, 37.

However, the setting of the pressure reducing valve 95 is primarily set by a relief valve 117. The pressure within the pressure reducing valve 95 flows out a pilot outlet 119, through a check valve 121, to the relief valve 117. When the pressure within the pressure reducing valve 95 reaches the setting on the relief valve 117, the relief valve 117 opens and allows the pressure to bleed off to the tank 43. The reduced pressure exiting the outlet 115 of the pressure reducing valve 95 is thus set by the relief valve 117.

Another directional control valve 123 is mounted in the circuit as a safety measure. This directional control valve 123 can shift to open the pilot outlet 119 to the tank 43 if necessary.

If the directional control valve 93 is opened to the opposite position, the system pressure is applied to a different pressure reducing valve 125. This pressure reducing valve 125, and a related check valve 127, are identical to the first pressure reducing valve 95 and its related check valve 121. This pressure reducing valve 125 is also set by the relief valve 117. This valve 125, however, applies the reduced pressure to the opposite ends of the torque cylinders 36, 37. This, of course, causes an opposite rotation of the upper wrench assembly 23 relative to the lower wrench assembly 21. The two pressure reducing valves 95, 125 have check valves 129 within them, to allow the pressure to flow back through the pressure reducing valves 95, 125.

As pressure is applied to the torque cylinders 36, 37 additional pressure is also applied to the clampng cylinders 35. When the directional control valve 93 is opened, the system pressure is applied through a shuttle valve 131 to a pressure reducing valve 133. This pressure reducing valve 133 is similar to the other pressure reducing valves 95, 125.

In this pressure reducing valve 133, however, the pilot outlet 119 is sealed. The pressure setting of the valve 133 can be set manually with the adjusting screw 111. However, the reduced pressure which is being applied to the torque cylinders 36, 37, is also applied to the drain outlet 135 of the pressure reducing valve 133. Therefore, the setting of the pressure reducing valve 133 is equal to the setting of the adjusting screw 111 plus the reduced pressure being applied to the torque cylinders 36, 37. The setting of the pressure reducing valve 133 can vary up to the system pressure of 2000 pounds per square inch.

The boost pressure, leaving the pressure reducing valve 133, opens a directional control valve 137, and flows through the directional control valve 137. The boost pressure then flows to a boost cylinder 139 on one end of each of the clamping cylinders 35. The boost pressure is multiplied by a factor of three by the boost cylinders 139 and added to the clamping pressure in the clamping cylinders 35.

When the directional control valve 93 is closed, the boost pressure drops to zero. The spring-loaded directional control valve 137 shifts, and the pressure in the boost cylinder is bled off to tank 45. Pressure can then be applied to the other end of the clamping cylinder 35 to pull the clamp 29 back away from the tool joint 15, 19.

In operation, the connection between the tool joints 15, 19 is made up of broken out in the following manner. After the wrench assemblies 21, 23 have been placed against the tool joints 15, 19, the directional control valve 75 is opened. This applies the 2000 pounds per square inch system pressure to flow control valve 77. The flow control valve 77 reduces the pressure and applies it to the lower end of the hydraulic cylinder 31. The upper end of the cylinder 31 is opened to the tank 45 through the directional control valve 75. The hydraulic cylinder 31 thus closes the gate 25.

When the gate 25 is closed on the tool joint 15, 19, pressure builds in the sequence valve 79. When the pressure reaches a set amount, the sequence valve 79 opens and applies pressure to the lower end of the hydraulic cylinder 33. The upper end of the cylinder 33 is open to the tank 45 through the directional control valve 75. The cylinder 33 thus closes the latch 27.

When the latch 27 is closed, pressure builds on the sequence valve 81. When the pressure reaches a set amount, the sequence valve 81 opens and applies pressure to a directional control valve 83. The directional control valve 83 opens to apply the system pressure of 2000 pounds per square inch to a pilot operated check valve 85. The system pressure flows through the check valve 85 to a gauge 87 and to the lower end of the clamping cylinder 35. The upper end of the cylinder 35 is open to tank 45, so the cylinder 35 closes the clamp 29 with a pressure of 2000 pounds per square inch.

The directional control valve 93 is then opened to apply the system pressure of 2000 pounds per square inch to one of the pressure reducing valves 95, 125, and through a shuttle valve 131 to a second pressure reducing valve 133. The pressure reducing valve 95, 125 reduces the system pressure to a lower pressure, determined by the setting of the relief valve 117. The reduced pressure is then applied to the torque cylinders 36, 37, and through the shuttle valve 99 to the gauge 101. The same reduced pressure is also applied to the drain outlet 135 of the pressure reducing valve 133.

The pressure reducing valve 133 applies a reduced pressure through the directional control valve 137 to the boost cylinders 139 on the the clamping cylinders 35. If the relief valve 117 is adjusted to apply more pressure to the torque cylinders 36, 37, then additional pressure is also applied to the boost cylinders 139 in proportion. The pressure applied to the boost cylinders 139 is equal to the sum of the pressure applied to the torque cylinders 36, 37 and the setting of the pressure reducing valve 133.

The invention has several advantages over the prior art. The torque pressure and the boost pressure can be independently adjusted by the adjusting screws 111 in the pressure reducing valves 95, 125, 133. In addition, both pressures can be adjusted with the relief valve 117. If the torque pressure is increased by a hundred pounds per square inch, the boost pressure will automatically be increased by the same amount. The increase in torque pressure will thus automatically cause a linearly proportional increase in the clamping pressure.

The invention has been shown in only one of its forms. It should be apparent to those skilled in the art that it is not so limited, but is susceptible to various changes and modifications without departing from the spirit thereof.

I claim:

1. A tool for gripping a section of pipe, the tool comprising:
   - a wrench assembly;
   - clamping means, on the wrench assembly, for clamping onto the section of drill pipe;
   - torque means for applying a torque to the wrench assembly, to cause a rotation of the wrench assembly;
   - power means for supplying hydraulic pressure to the clamping means and the torque means;
   - adjustment means for adjusting the hydraulic pressure applied to the torque means; and
   - valve means for causing the hydraulic pressure applied to the clamping means to automatically vary linearly with the hydraulic pressure applied to the torque means.

2. A torque wrench for making and breaking connections between sections of pipe, the torque wrench comprising:
   - a lower wrench assembly;
   - an upper wrench assembly, mounted above the lower wrench assembly;
   - lower clamping means, on the lower wrench assembly, for clamping onto a tool joint on one end of one of the sections of drill pipe;
   - upper clamping means, on the upper wrench assembly, for clamping onto a tool joint on one end of the other section of drill pipe;
   - torque means for applying a torque to one of the wrench assemblies, to cause a relative rotation of one of the wrench assemblies relative to the other wrench assembly, to make up or break out a connection between the tool joints on the sections of drill pipe;
   - power means for supplying hydraulic pressure to the lower clamping means, the upper clamping means, and the torque means;
   - adjustment means for adjusting the hydraulic pressure applied to the torque means; and
   - valve means for causing the hydraulic pressure applied to one of the clamping means to automatically vary linearly with the hydraulic pressure applied to the torque means.

3. A torque wrench for making and breaking connections between sections of pipe, the torque wrench comprising:
   - a lower wrench assembly;
   - an upper wrench assembly, mounted above the lower wrench assembly;
   - lower clamping means, on the lower wrench assembly, for clamping onto a tool joint on one end of one of the sections of drill pipe;
   - upper clamping means, on the upper wrench assembly, for clamping onto a tool joint on one end of the other section of drill pipe;
   - torque means for applying a torque to one of the wrench assemblies, to cause a relative rotation of one of the wrench assemblies relative to the other wrench assembly, to make up or break out a connection between the tool joints on the sections of drill pipe;
   - power means for supplying hydraulic pressure to the lower clamping means, the upper clamping means, and the torque means;
   - adjustment means for adjusting the hydraulic pressure applied to the torque means; and valve means for causing the hydraulic pressure applied to the lower clamping means and the upper clamping means to automatically vary linearly with the hydraulic pressure applied to the torque means.

4. A torque wrench for making and breaking connections between sections of pipe, the torque wrench comprising:

a lower wrench assembly, having a gate, a latch, and a clamp for clamping onto a tool joint on one end of one of the sections of drill pipe;

an upper wrench assembly, having a gate, a latch, and a clamp for clamping onto a tool joint on one end of the other section of drill pipe, the upper wrench assembly being mounted above the lower wrench assembly;

torque means for applying a torque to one of the wrench assemblies, to cause a relative rotation of one of the wrench assemblies relative to the other wrench assembly, to make up or break out a connection between the tool joints on the sections of drill pipe;

power means for supplying hydraulic pressure to the clamps and the torque means;

adjustment means for adjusting the hydraulic pressure applied to the torque means; and valve means for causing the hydraulic pressure applied to one of the clamps to automatically vary linearly with the hydraulic pressure applied to the torque means.

5. A torque wrench for making and breaking connections between sections of pipe, the torque wrench comprising:

a lower wrench assembly, having a gate, a latch, and a clamp for clamping onto a tool joint on one end of one of the sections of drill pipe;

an upper wrench assembly, having a gate, a latch, and a clamp for clamping onto a tool joint on one end of the other section of drill pipe, the upper wrench assembly being mounted above the lower wrench assembly;

torque means for applying a torque to one of the wrench assemblies, to cause a relative rotation of one of the wrench assemblies relative to the other wrench assembly, to make up or break out a connection between the tool joints on the sections of drill pipe;

power means for supplying hydraulic pressure to the clamps and the torque means;

adjustment means for adjusting the hydraulic pressure applied to the torque means; and valve means for causing the hydraulic pressure applied to the clamps to automatically vary linearly with the hydraulic pressure applied to the torque means.

* * * * *